Figures 2, 5:
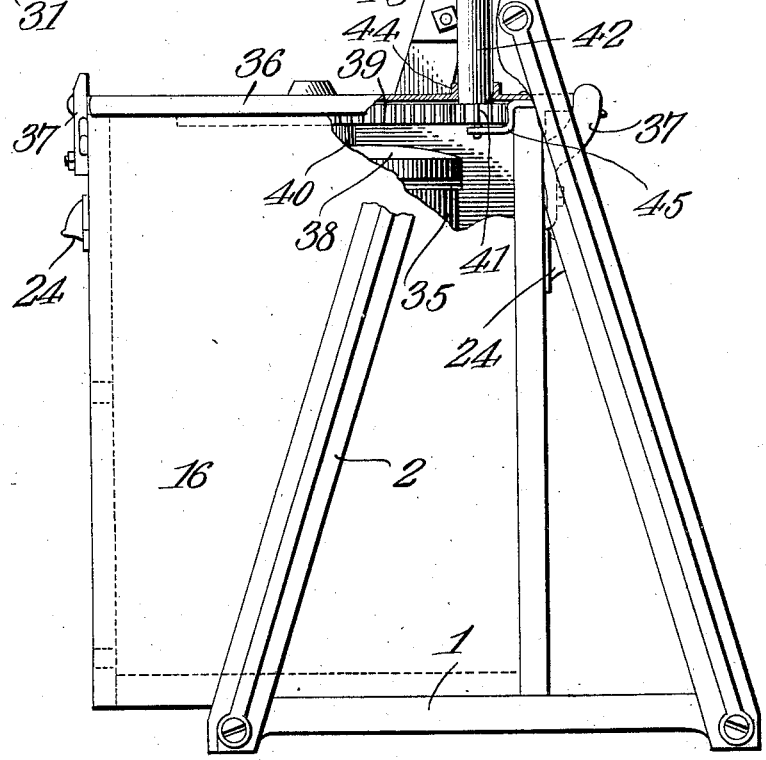

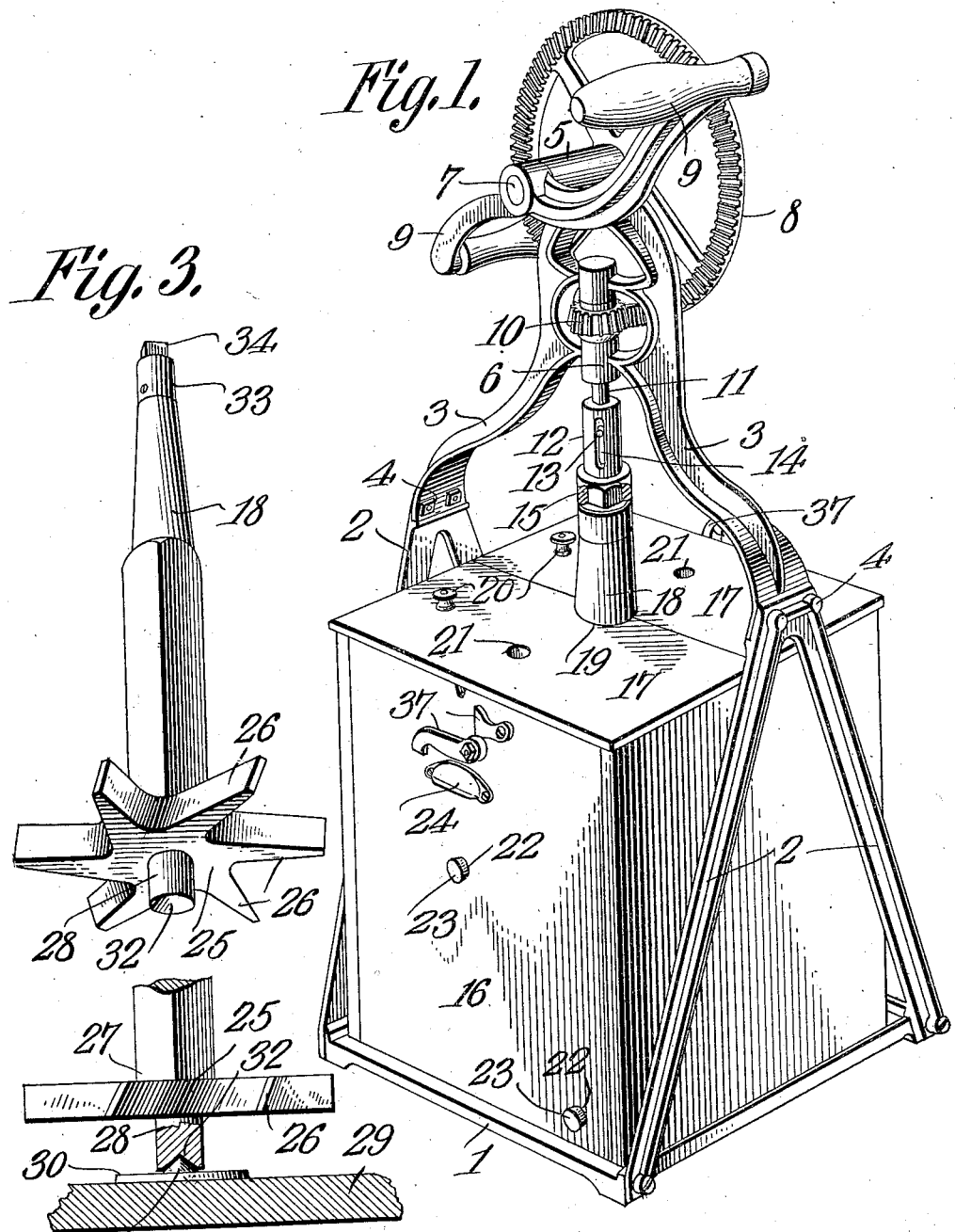

No. 872,636. PATENTED DEC. 3, 1907.
I. T. BABBITT.
ICE CREAM FREEZER AND CHURN.
APPLICATION FILED SEPT. 24, 1906.

2 SHEETS—SHEET 2.

WITNESSES:

Ira T. Babbitt, INVENTOR.

By

ATTORNEYS

UNITED STATES PATENT OFFICE.

IRA TAYLOR BABBITT, OF ABINGDON, ILLINOIS.

ICE-CREAM FREEZER AND CHURN.

No. 872,636.    Specification of Letters Patent.    Patented Dec. 3, 1907.

Application filed September 24, 1906. Serial No. 335,949.

*To all whom it may concern:*

Be it known that I, IRA TAYLOR BABBITT, a citizen of the United States, residing at Abingdon, in the county of Knox and State of Illinois, have invented a new and useful Ice-Cream Freezer and Churn, of which the following is a specification.

This invention relates to an apparatus which is adapted for use as an ice cream freezer or a butter churn, and is of that type in which the driving mechanism is mounted upon a suitable frame at a point above the churn body or tub which rests on the base of the frame.

One of the objects of the invention is to improve the construction and operation of this class of devices so as to be strong and substantial and have a large and stable supporting base and so as to operate with ease and with comparatively little power.

A further object of the invention is the provision of mechanism whereby the rotating elements, such as the churn dasher or can for freezing cream, can be driven by the driving mechanism on the supporting frame.

Another object of the invention is to provide an improved form of churn paddle or dasher which is highly efficient in operation and whose bearing is so constructed as to prevent the formation of black grease between the wearing parts, which is a common objection to other forms of churns.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawings, which illustrate one of the embodiments of the invention, Figure 1 is a perspective view of the apparatus in condition for use as a churn. Fig. 2 is a side elevation, partly broken away, showing the apparatus in use as an ice cream freezer. Fig. 3 is a perspective view of the churn dasher. Fig. 4 is a detail view of the bearing for the dasher. Fig. 5 is a detail sectional view of the lower end of the freezer can and the bearing therefor.

Corresponding parts in the several figures are indicated throughout by similar characters.

Referring to the drawing, 1 designates the bottom of the supporting frame, to two opposite sides of which are bolted or otherwise suitably secured the inverted V-shaped uprights 2. The upper ends of the uprights 2 support the arched cross head 3 rigidly held in place by the bolts 4. These several members, which form the supporting frame, are preferably made of iron so as to be sufficiently rigid, and the bottom 1 is of such a size as to afford a large and substantial supporting base for the apparatus. Arranged at the central portion of the cross head 3 is a horizontal bearing 5 and two spaced vertical bearings 6 located below the bearing 5. In the bearing 5 is mounted a shaft 7 on which is keyed a large miter gear wheel 8, and also keyed to the shaft are the cranks 9. These cranks are arranged at 180° apart and disposed on opposite sides of the cross head 3. The gear wheel 8 meshes with a pinion 10 on the vertical spindle 11 journaled in the bearings 6. The miter gears 8 and 10 thus constitute a speed multiplying mechanism between the driving shaft 7 and spindle 11. On the lower end of the spindle 11 is a longitudinally movable coupling 12, which is in the nature of a sleeve slidable on the spindle, and keyed thereto by means of a pin 13 on the spindle engaging in the slot 14 of the coupling. The lower end of the coupling is suitably shaped so as to be readily fitted to the churn dasher or cream freezer driving mechanism. For this purpose, the coupling is formed with a socket 15 having a square or other angular interior.

16 designates the churn body or tub which is preferably made of wood and in the form of a box of square horizontal cross section. The tub 16 loosely rests on the bottom 1 of the supporting stand and is adapted to be seated with its axis alining with the spindle 11 when in use as a churn, or to be seated slightly to one side, as shown in Fig. 2, when in use as a cream freezer. The tub is fitted with a cover, which is used during churning, that is composed of two sections 17 split in line with the dasher shaft 18 and having semi-circular notches 19 forming a bearing for the said shaft, as shown in Fig. 1. The sections 17 are each provided with buttons or other hand holds 20 whereby they can be gripped. For affording vent, one or more openings 21 are provided in the cover. In the wall of the tub 16 are arranged drain openings 22 which are normally plugged by stoppers 23 during the churning operation. These plugs are taken out when it is desired to drain off the buttermilk, and when it is desired to drain off the ice water when the device is used as a freezer. Suitable hand holds 24 are arranged at the sides of the tub whereby the same can be lifted and moved.

A revoluble element is designed to be driven by the mechanism hereinbefore described and the same in the present instance constitutes a churn dasher or paddle. This dasher, as shown in Figs. 3 and 4, comprises a star-shaped agitator 25, pinned, or otherwise rigidly secured, to the lower end of the shaft 18. The arms 26 extend from the body portion of the agitator in an approximately tangential direction, and each arm tapers toward the outer end. The arms in cross section are rectangular and the long dimension thereof is inclined to a plane passing through and parallel with the axis of the shaft 18. By this particular form, the agitator serves to throw the cream outwardly and upwardly at the same time, the upward movement being more or less in a spiral direction, due to the inclination of the arms or blades 26. The shaft 18 is somewhat reduced at its lower end where it extends through the agitator to form a shoulder abutting the latter, as shown at 27, Fig. 4. The reduced end 28 of the shaft extends some distance below the agitator, so as to support the same above the bottom 29 of the tub. This space between the agitator and bottom of the tub is essential in order that there will be a free flow of the cream from all sides to the spaces between the arms 26 of the agitator, thereby enabling the proper circulation of the cream. The portion of the shaft 18 that extends into the tub 16 is preferably of square cross section, so that the corners or angles thereof assist in agitating the cream, and these corners are particularly effective in collecting or gathering the particles of butter during the final stage of the churning, it being understood that the butter particles as they begin to form ascend to a point out of the region of the agitator 25 so that the square portion of the shaft is relied upon to gather the particles.

The coupling 12 does not serve to suspend the dasher on the spindle 11, since the dasher is supported on a step bearing arranged on the bottom 29 of the tub. This step bearing comprises a plate 30 secured to the bottom 29 and having a cone 31 cast integral with the plate. The lower end 28 of the dasher shaft is provided with a conical socket 32 into which the cone 31 extends, the angularity of the socket is more obtuse than the cone, so that the apex of the latter forms the effective bearing point for the dasher. By arranging the socket in the paddle shaft, instead of in the bearing plate as is the usual construction, and by having a relatively small area of bearing surface, it has been found that the black grease, that usually accumulates between the bearing parts exposed to the cream, does not form. The dasher, which is preferably made of wood, is provided at the upper end of the shaft 18 with a metal cap 33 having a squared portion 34 that engages in the socket 15 of the coupling on the spindle 11. By this means, it is simply necessary to lift the coupling 11 to disengage the dasher for removing the tub 16 with its contents.

In using the apparatus for freezing cream, the tub 16 serves as a receptacle for holding the freezer can and the salt and ice for packing around the latter.

The freezer can 35, Figs. 2 and 5, and the dasher therefor, may be of any approved construction, except that the lid of the can is provided with a suitable means for connection with the driving spindle 11. The can 35 may be coupled directly to the spindle 11 so as to rotate at the same speed thereof, or, by preference, a speed reducing gear is employed in the driving connection between the spindle and can 35.

The upper end of the freezer can is journaled in a cross bar 36 secured rigidly in place by the usual fastening devices 37, and the can top 38 is provided with a large gear wheel 39, the same being mounted on a stud 40 on a revoluble element which in the present instance is in the form of a can top 38. This stud or boss 40 serves to space the gear 39 from the can top 38 for the purpose of permitting cracked ice to be packed on the top of the can with facility, thereby insuring effective freezing of the cream. Meshing with the gear 39 is a pinion 41 that is keyed to a short vertically disposed shaft 42 having a squared upper extremity 43 for fitting in the socket of the coupling 12. The shaft is mounted in a boss 44 on the cross head 36 and the weight thereof is taken by a bracket 45 at its lower end and secured to the cross bar. Since the short shaft 42 is located laterally of the axis of the freezing can, it is necessary to support the tub 16 sufficiently at one side of the center of the bottom 1 of the supporting frame to bring the shaft 42 in alinement with the driving spindle 11. As shown in Fig. 5, the bottom of the can 35 is provided with a socketed bearing member 46 for fitting in a bearing cone 31 on the tub bottom. By the employment of gears in the driving connection between the spindle 11 and the freezer can, any desired speed of rotation may be obtained, the size of the gear 39 and pinion 41 being determined according to the requirements. Instead of driving the churn dasher directly by the spindle 11, it is obvious that a gearing similar to that described in connection with the freezer can may be employed for the purpose of producing a higher or lower speed than the spindle.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

In a device of the class described the combination with a supporting frame having a bottom; of a body mounted upon the bottom, a revoluble element within the body, a shaft revoluble simultaneously with said element, means mounted upon the body and constituting a bearing for the shaft, said shaft having an angular end portion, a spindle journaled within the supporting frame, a longitudinally movable slotted coupling upon the spindle, means on the spindle and within the slot to limit the longitudinal movement of the coupling, said coupling having a socket disposed below the spindle and designed to engage the angular portion of the shaft, and means upon the supporting frame for rotating the spindle and coupling, the receptacle being adjustable upon the bottom of the frame to center the shaft below the coupling.

In testimony that I claim the foregoing as my own, I have hereto affixed my signature in the presence of two witnesses.

IRA TAYLOR BABBITT.

Witnesses:
  OSCAR LATIMER,
  H. L. HAYNES.